Sept. 20, 1971      JOE DOROUGH, JR      3,606,252

PORTABLE ELECTRIC AUTOMOBILE JACK

Filed July 15, 1969

JOE DOROUGH, JR.
INVENTOR.

BY *Marion E. Shafer*

ATTORNEY.

3,606,252
PORTABLE ELECTRIC AUTOMOBILE JACK
Joe Dorough, Jr., 2515 Community Drive, Apt. 2003,
Dallas, Tex. 75220
Filed July 15, 1969, Ser. No. 841,742
Int. Cl. B66f 3/18
U.S. Cl. 254—103                                2 Claims

ABSTRACT OF THE DISCLOSURE

A portable electric automobile jack that raises and lowers the bumper of a vehicle in a smooth continuous motion using electric power produced by the automobile but the structure of which is otherwise independent from the body of the automobile; thereby enabling the jack to be disassembled, transported to other vehicles when needed and stored in the trunk of the automobile.

SUBJECT MATTER OF INVENTION

This invention relates to lifting devices, and more particularly, it relates to a portable jack for vehicles that is electrically operated, yet which is not a permanent part of the vehicle.

BACKGROUND OF THE INVENTION

In the past, many devices and means by which a vehicle may be raised to facilitate the changing of a tire, or perform other repairs have been designed. The most common is the standard hand operated jack which is standard equipment in most cars. These require much strain and considerable mental anquish as well to get them to perform their desired function. The jacks must be cranked up by hand, a job which is very difficult for a woman, and often for a man as well. Such hand operated jacks frequently jam due to the inadequate means for shifting their direction of operation. This often results in injury or damage to the vehicle as it must be driven off the jack or the jack must be kicked out from under the car. Another fault of these hand operated jacks is that they often slip as they are lifted by a ratchet device.

Another form of jacking device is the hydraulic. Systems have been designed whereby these hydraulic jacks are installed at great cost in the vehicle, with one jack for each wheel. This is required due to the extreme weight of the jacks, which make them impossible to lift or carry. Such permanent hydraulic jacks add considerable excess weight to the vehicle since the jacks are permanent parts of the car.

A further problem with previously available mechanical jacks has been that stout people find it practically impossible to get down to the position required to position and operate such jacks.

OBJECTS OF THE INVENTION

It, therefore, becomes an object of this invention to provide an electrically operated automobile jack that will raise and lower an automobile for repairs and various other maintenance with minimum stooping and physical exertion on the part of the operator since it is electrically operated and requires no cranking of any kind.

A further object of this invention is to provide a portable automobile jack that can be positioned and operated with a minimum of stooping by the operator.

Another object of this invention is to provide a portable automobile jack that is compact and light in weight so that it can be easily carried in the trunk of a car in the same manner as the standard jack and quickly assembled when needed. Said jack is also designed to quickly and easily be lifted, assembled and operated by women and people with limited strength.

Another object of this invention is to provide a portable automobile jack that can be operated by the power source produced by the vehicle, eliminating dependence upon or the necessity of carrying a separate power supply.

Another object of this invention is to provide an electric automobile jack that will lower the car in the same smooth motion by which it was raised by simply pushing the opposite button on the directional switch as was used to raise the jack.

Another object of this invention is to provide a portable automobile jack that does not have to be installed under the frame of the car, therefore eliminating the additional weight that would be added to the car by a plurality of permanently mounted jacks and enabling the jack to be used on vehicles other than the owner's.

These and other objects and advantages of this invention will become apparent through consideration of the following description and appended claims in conjunction with the attached drawings in which:

DESCRIPTION OF THE SEVERAL VIEWS IN THE DRAWINGS

Figure 1:
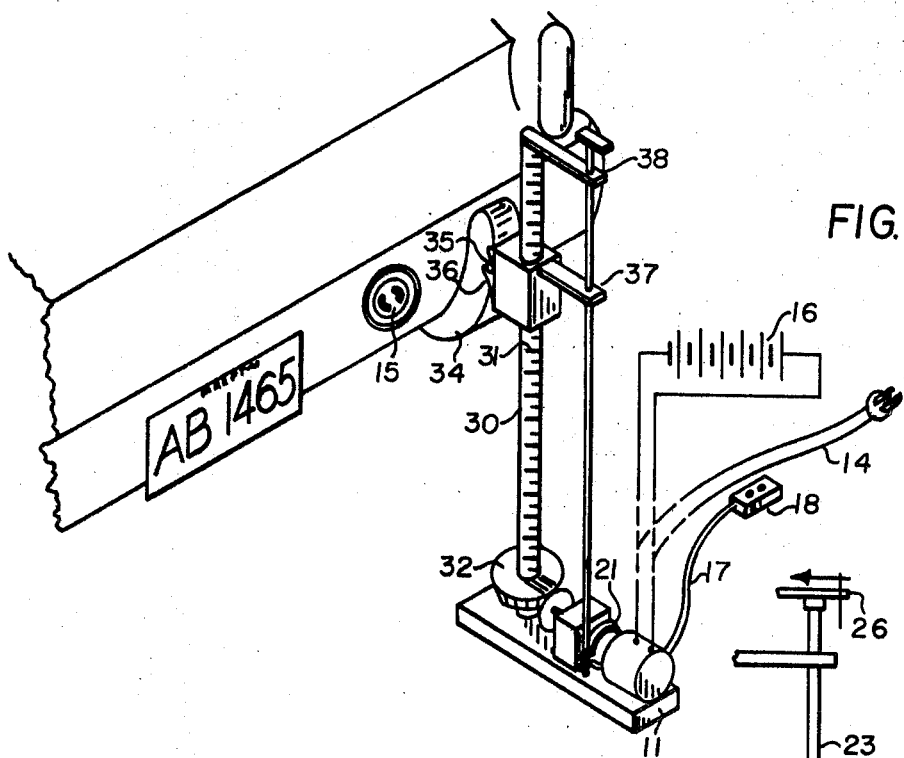
FIG. 1 is a perspective view of the portable electric automobile jack described herein showing the jack assembled and in use to lift an automobile.

In describing one selected form or preferred embodiment of this invention as shown in the drawings and described in this specification, specific terms and components are used for clarity. However, it is not intended to limit the claimed invention to the specific form, components or construction shown and it is to be understood that the specific terms used in this illustration of the invention are intended to include all technical equivalents which operate in a similar manner to accomplish a similar purpose.

DETAILED DESCRIPTION OF PREFERRED EMBODIMENT OF INVENTION

Referring to the specific embodiment of the invention selected for illustration in the accompanying drawings, the number 11 designates a rectangular base plate upon which the heavier parts of the mechanical apparatus are mounted. Bearing well 12 is recessed into the upper surface of base plate 11 near one end of said base to receive and provide support for a vertically positioned insertable removable lift shaft. Said bearing well 12 is provided with suitable bearing surface material to facilitate free rotation as well as support for the lift shaft.

At the opposite end of said base plate 11 is mounted a reversible electric drive motor 13 selected to operate from a low voltage DC electrical power source such as the battery of the automobile with which the jack is to be used. A suitable power connector cable 14 is provided to connect said motor 13 to a suitable electric source such as an adapter socket 15 mounted in the bumper of the car, on the body of the car or inside the trunk of the car or any suitable external electric power source represented by battery symbol 16. Control cable 17 extends between electric motor 13 and switch box 18 which is provided with two switches and switching circuits connected in such manner as to cause motor 13 to rotate in a clockwise direction so long as the first switch is depressed and to cause the motor to rotate in the opposite direction while the second or reverse switch is depressed. With neither switch depressed said electric motor 13 will be turned off and will not operate. It will be appreciated that a variety of electric and mechanical devices could be substituted to reverse the direction of drive supplied by the motor, and parts 17 and 18 are meant to designate only a means of reversing the direction of electric drive provided by motor 13. It should also be appreciated that direction switch assembly 18 could be fabricated in the form of a pair of foot pedal switches so that they could be operated from a standing position or either direction control device could be held in the operator's hand while in use. Not that this precludes the necessity of the operator stooping over while operating the jack.

Drive shaft 19 from electric motor 13 extends toward bearing well 12 and at an intermediate point on said drive shaft is mounted a drum with a break shoe surface 20 and this half of the break mechanism will hereafter be referred to as break shoe 20. The two halves of break clamp 21 are mounted on break support pin 22 and extend around break shoe 20 so that they provide a friction breaking action when they are tightened by break control rod 23. Said break control rod 23 is provided with suitable threads on the lower portion of said rod 23 which engage reciprocal threads provided in the lips 24 of break clamp 21. Said break clamps 21 are tightened or loosened in a conventional manner by rotating break control rod 23 which is provided with a suitable handle 26 to facilitate manual operation of said break. It will be readily apparent that an automatic break or an automatic electric break could be substituted to provide an alternate means of braking when the drive motor is not in use to raise or lower the lift carriage mechanism.

The rotational energy from electric motor 13 is fed via drive shaft 19 into the input of a standard gear box assembly 27 which decreases the speed of the rotary motion and increases the torque of the device. The rotary output from said gear box assembly 27 is fed via output gear shaft 28 to a vertically positioned bevel gear 29 which is mounted on the end of output gear shaft 28.

Vertically positioned insertable-removable lift shaft 30 is provided with a bearing surface at its lower end and is adapted to fit into bearing well 12 in such manner as to be held in a vertical or upright position with respect to base plate 11. Most of the upper part of lift shaft 30 is provided with a worm gear thread 31 and a horizontally positioned bevel gear 32 mounted at an intermediate point on the lower part of lift shaft 30 at such a point as to engage vertically positioned bevel gear 29 to convert horizontal rotary motion from electric motor 13 into vertical rotary motion and of course such vertical rotary motion is transmitted to lift shaft 30 on which said bevel gear 32 is mounted.

Figure 2:
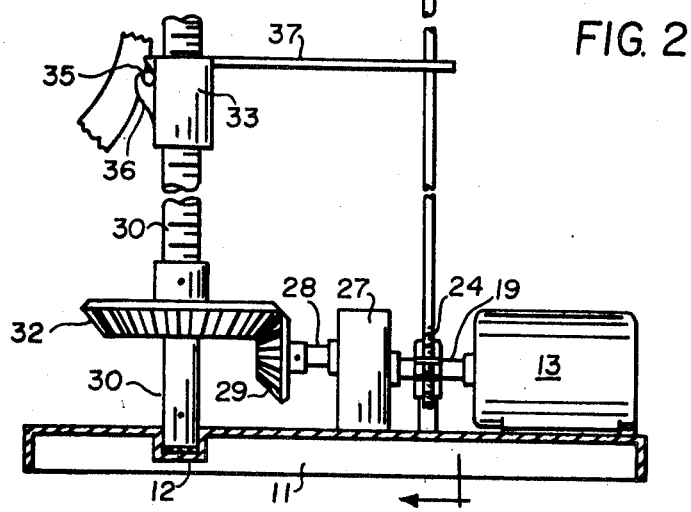
FIG. 2 is a partial side view of the mechanical parts of the invention.
Figure 3:
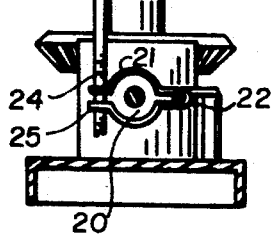
FIG. 3 is a partial cut away end view of the device showing the breaking mechanism.

Lift carriage assembly 33 is provided with an internal worm gear or thread and operates much like a nut on a bolt so that said carriage will ride up or down on worm gear threads 31 on lift shaft 30 as said lift shaft is rotated in one direction or the other. Bumper hook 34 is attached to the forward end of lift carriage assembly 33 by means of bar hinge 35 which set into hooks 35 and 35 on the opposite forward sides of said lift carriage assembly 33. Since bumper hook 34 and bar hinge 35 readily lift out of hooks 35—35 on carriage assembly 33 it can be readily seen that a variety of interchangeable sizes and shapes of bumper hooks can be provided to adapt said electric jack to a variety of models of automobiles and to permit adaptation of the jack for use with future automobiles. Extending from the rear end of said lift carriage assembly 33 is a horizontal rod stabilizer 37 provided with a hole through said stabilizer to secure break control rod 23 as shown in FIGS. 1 and 2 of the drawings.

A horizontal handle 38 is pivotally connected to the top of lift shaft 30 which enables the operator to insert lift shaft 30 into bearing well 12 and to position the jack from a standing position. Said handle 38 also is provided with an opening at the remote end from the pivot so that said handle 38 also serves as a stabilizer for break control rod 23 which is passed down through the openings in handle 38, stabilizer 37 and screwed into lips 25 of break clamp 21. This arrangement of parts enables lift shaft 30 break control rod 23 and associated stabilizer supports to provide mutual support and vertical alignment of the upper parts of the jack.

Electric motor 13, break mechanism 20 and 21, gear box assembly 27 and vertically positioned bevel gear 29 are permanently mounted on base plate 11 and constitute one packaged part of said jack that is easily handled, moved and stored as a unit. On the other hand the upstanding or vertical parts of the jack including life shaft 30, break control rod 23 and lift carriage assembly 33 either plug or screw into the base during use only, and after usage may be detached from the base plate for convenient handling and separate storage.

It will readily be appreciated by anyone reasonably skilled in the art that said vertical components of the jack could be collectively housed in an appropriate frame or housing so that all of said vertical parts of the jack could be plugged into position on base plate 11 simultaneously or detached simultaneously with only minor modification of the connective parts and without departing from the purpose or spirit of the invention described and claimed herein. By housing all of the vertical components of the jack within a single structure with an appropriate handle across the top of said housing structure the adaptability of operating said jack from a standing position would be further enhanced and there would be the further convenience of having a jack with only two component parts to handle and store. Under such circumstances directional control switches 18 could very well be incorporated into the handle of such collective housing and an automatic electrically controlled break could be provided that would automatically lock the break mechanism when neither the raise or lower button are depressed.

OPERATION

In operation, the jack is removed from the trunk of the car and base plate 11 placed near the position where the automobile is to be raised. The lifting and vertical components of the jack are assembled by inserting the end of lift shaft 30 into bearing well 11. Bumper hook 34 is then set on hinge hooks 35—35. Brake control rod 23 is inserted through the handle and rod stabilizers 37 and screwed into lips 25 of brake clamp 21. The jack is then positioned with bumper hook 34 in the desired position to engage the bumper of the automobile to be lifted. A power cord 14 from the electric motor is plugged into a suitable outlet from the car's electric system or other suitable source to supply power to operate the motor and the jack. By depressing the first or lift switch on direction control switch box 18 power is applied to motor 13 in such manner as to cause said motor to turn in one direction. The rotary energy from said motor is delivered via drive shaft 19 to the input of gear box 27 where the speed of rotation is reduced and the torque is increased and the increased power is applied through gear shaft 28 to provide rotary drive to vertically positioned beveled gear 29.

Since horizontal bevel gear 32 is positioned to mesh with vertical gear 29 rotation of gear 29 transmits rotation to gear 32 and through it to lift shaft 30. Lift carriage assembly 33 is prevented from turning by engagement of bumper hook 34 with the bumper of the automobile being jacked up. As the worm gear threads on lift shaft 30 turn against the reciprocal worm gear threads in lift carriage assembly 33 as lift shaft 30 is rotated, the lift carriage is driven upward lifting the automobile with it. When the car is raised to the desired level, the lift button on switch 18 is released causing the motor and the jack to stop. To prevent the weight of the car from operating the jack in reverse, handle 26 is employed to turn break control rod 23 and lock break assembly 20 and 21.

When the repair work on the automobile is completed, said break control is released and the reverse button on switch 18 is depressed which causes electric motor 13 to turn in the reverse direction which operates the previously described train of transmission of rotary power in reverse lowering lift carriage assembly 33 and the automobile in a gradual manner. The jack is then unplugged, disassembled and the component parts of the jack returned to their customary storage place.

ADVANTAGES

A principal advantage of this invention is that the electric automobile jack will raise and lower an automobile for repairs and maintenance without the need of physical exertion on the part of the operator since it is electrically operated and requires no cranking of any kind.

Another advantage of this invention is that the electric automobile jack is light in weight and can be easily carried in the trunk of a car in the same manner as the standard jack and quickly assembled when needed. It is also sufficiently portable and adaptable that it can be used with other cars when needed.

Still another advantage of this invention is that the electric automobile jack can be operated by the power source produced by the vehicle, thus eliminating the necessity of carrying a separate power supply.

Another advantage of this invention is that the electric automobile jack will lower the car in the same smooth motion it raised it by simply pushing the opposite button on the directional switch as was used to raise the jack.

A still further advantage of said portable electric jack described herein is that it can be operated almost entirely from a standing position which is of considerable importance to stout people.

Another advantage of this invention is that this portable electric automobile jack does not have to be permanently installed under the frame of the car and therefore eliminates the additional weight that would be added to the car by installation of permanently installed jacks at each corner of the automobile.

Although this specification describes but a single embodiment of the invention with certain applications thereof, it should be understood that structural or material rearrangements of adequate or equivalent parts, substitutions of equivalent functional elements and other modifications in structure can be made and other applications devised without departing from the spirit and scope of my invention. I therefore desire that the description and drawings herein be regarded as only an illustration of my invention and that the invention be regarded as limited only as set forth in the following claims, or as required by the prior art.

Having thus described my invention, I claim:

1. A portable electrically operated automobile jack comprising:
    (A) a base plate provided with a bearing well and adapted to support the various parts of said electric automobile jack on the upper surface of said base plate;
    (B) a reversible electric drive motor capable of operating from a DC voltage source, such as the battery of the automobile with which the jack is to be used;
    (C) a power connector cable adapted to connect to a suitable DC power source;
    (D) a control cable with a switch box having
        (1) a first switch driving the electric motor in a clockwise direction while the switch is depressed,
        (2) a second switch closing a circuit that will cause the motor to be driven in reverse direction when depressed;
    (E) a break shoe attached at an intermediate point on the drive shaft of said electric motor;
    (F) a standard gear box assembly attached to the end of the drive shaft of the electric motor to increase the torque and to decrease the speed of rotation having
        (1) an output gear shaft, and
        (2) a bevel gear mounted on the end of said gear shaft;
    (G) a vertically positioned insertable-removable lift shaft having
        (1) a bearing surface at the lower end of said gear shaft and adapted to set into the bearing well in the base plate,
        (2) provided with a worm gear along almost all of the upper portion of said lift shaft, and
        (3) provided with a pivoted horizontal handle attached to the upper end of said lift shaft, and
        (4) having a guide hole in said handle to support a break control rod;
    (H) a horizontally positioned bevel gear mounted at an intermediate point on the lower part of said lift shaft where it will engage with the bevel gear on the end of the gear shaft to change the angle of rotary motion from the drive motor from horizontal drive to vertical drive;
    (I) a lift carriage assembly provided with
        (1) an internal gear mechanism adapted to make the lift carriage ride up or down the lift shaft depending upon the direction of rotation of said lift shaft,
        (2) a suitable bumper hook hingedly connected to the forward side of the lift carriage and being adapted to engage and support the bumper of an automobile, and
        (3) a rod stabilizer extending from the rear of the lift carriage and provided with a guide hole to support a break control rod;
    (J) a break clamp adapted for engagement with the break shoe attached to the drive shaft on the electric motor;
    (K) a break control rod which passes through the guide holes provided in the main handle on the upper end of the lift-shaft and the rod stabilizer on the lift carriage assembly; said break control rod being provided with
        (1) threads on the lower portion of said break control rod adapted to engage the break clamp to lock said break when the break control rod is turned in one direction and to release the break when the break control rod is turned in the reverse direction, and
        (2) a handle on the upper end of said break control rod by which the operator can lock or release said break.

2. A portable electrically operated automobile jack comprising:
    (A) a base plate provided with a bearing well and adapted to support the various parts of said electric automobile jack on the upper surface of said base plate;
    (B) a reversible electric drive motor capable of operating from a DC voltage source, such as the battery of an automobile including a power connector cable adapted to connect to a suitable source of electric power;
    (C) means for turning said electric motor off and on and for controlling the direction of rotation;
    (D) an insertable-removable vertically positioned lift shaft provided with a worm gear thread along most of said shaft's upper surface and a gear means to transmitting rotational power to said lift shaft;
    (E) means for transferring rotational power from the electric motor to said life shaft including means of reducing the speed and increasing the torque of the rotational power delivered to the jack;

(F) break means for locking said jack when the electric motor is turned off;
(G) a lift carriage assembly adapted to ride up or down the worm gear on the lift shaft depending upon the direction of rotation of said shaft;
(H) a bumper hook attached to said lift carriage assembly and adapted to engage the bumper of an automobile to lift said automobile as required for servicing; and
(I) handle means at the upper end of said lift shaft to enable the operator to position and manipulate said jack from a standing position.

References Cited

UNITED STATES PATENTS

| | | | |
|---|---|---|---|
| 2,981,518 | 4/1961 | Wise | 254—103X |
| 3,376,019 | 4/1968 | Weiss | 254—103 |
| 3,392,959 | 7/1968 | Lewis | 254—103 |

ROBERT C. RIORDON, Primary Examiner

D. R. MELTON, Assistant Examiner

U.S. Cl. X.R.

254—Dig. 2